United States Patent [19]
Nicot

[11] Patent Number: 5,755,517
[45] Date of Patent: May 26, 1998

[54] BEARING HAVING A SEAL WITH BUILD-IN ENCODER AND WHEEL HUB INCORPORATING SUCH BEARING

[75] Inventor: Christophe Nicot, Annecy, France

[73] Assignee: The Torrington Company, Torrington, Conn.

[21] Appl. No.: 771,495

[22] Filed: Dec. 23, 1996

[51] Int. Cl.[6] ............................. F16C 19/00; G01P 3/44
[52] U.S. Cl. ............................. 384/448; 324/207.25
[58] Field of Search ........................ 384/448; 324/173, 324/174, 207.25

[56] References Cited

U.S. PATENT DOCUMENTS

| | | | |
|---|---|---|---|
| 5,004,358 | 4/1991 | Varvello et al. | 384/448 X |
| 5,097,701 | 3/1992 | Nantua et al. | 73/118.1 |
| 5,431,413 | 7/1995 | Hajzler | 277/2 |
| 5,451,869 | 9/1995 | Alff | 384/448 X |
| 5,470,157 | 11/1995 | Dougherty et al. | 384/448 |
| 5,476,272 | 12/1995 | Hixson, II | 324/173 X |

FOREIGN PATENT DOCUMENTS

| | | |
|---|---|---|
| 0 323 789 A1 | 12/1988 | European Pat. Off. . |
| 0 511 106 A1 | 4/1992 | European Pat. Off. . |
| 0 607 719 | 12/1993 | France . |

Primary Examiner—Thomas R. Hannon
Attorney, Agent, or Firm—John C. Bigler

[57] ABSTRACT

A bearing comprises an inner race, an outer race mounted via rolling bodies around the inner race, one of the races being a rotatable race, and seals that seal the bearing. One of the seals incorporates an encoder element rotatable with the rotating race and includes an armature that has a radial extension extending along a lateral face of the rotating race. The radial extension compensates for the thickness of the device for fixing the sensor element. The present invention also relates to a wheel hub mounted via such a rolling-contact bearing.

9 Claims, 2 Drawing Sheets

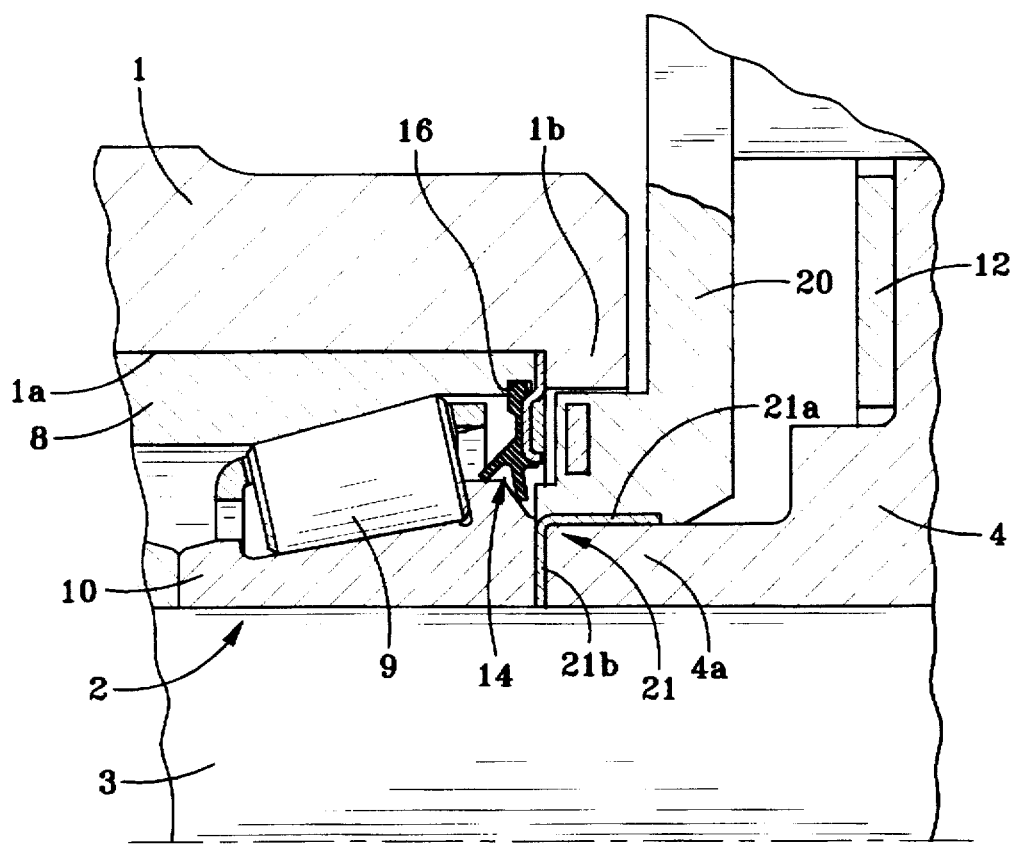
FIG. 2
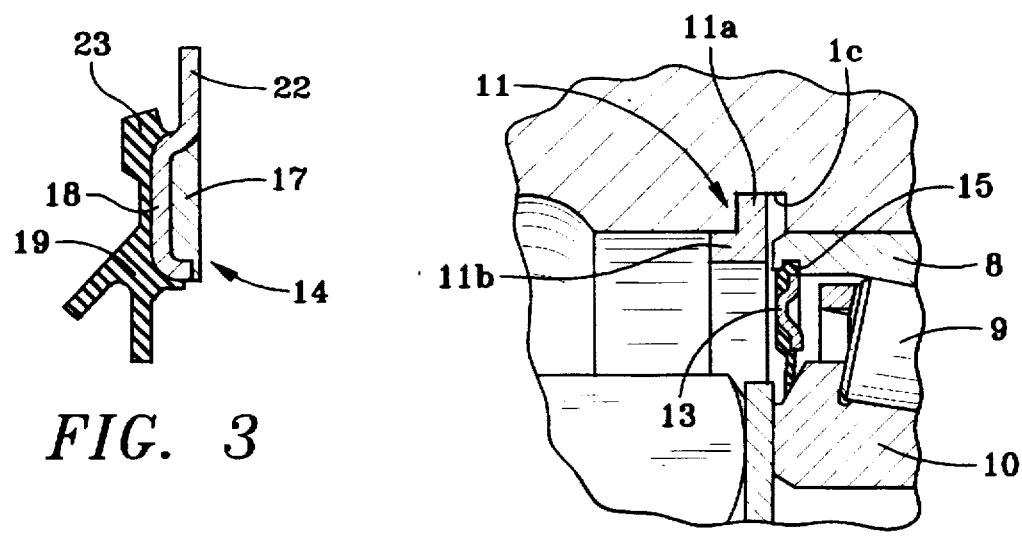
FIG. 3
FIG. 4

BEARING HAVING A SEAL WITH BUILD-IN ENCODER AND WHEEL HUB INCORPORATING SUCH BEARING

BACKGROUND OF THE INVENTION

This invention relates generally to a rolling-contact bearing in which the seal incorporates an encoder device which moves past a stationary sensor device. It also relates to a wheel hub incorporating such a rolling-contact bearing.

The invention relates more particularly to a rolling-contact bearing in which the encoder device is incorporated into the seal in such a way that the encoder device lies substantially flush with the plane of a lateral face of the bearing. The publications FR 2,625,777 and FR 2,700,588 make known such bearings in which a sensor device, arranged facing an encoder device, allows the rotational speed of the bearing to be measured.

In particular, publication FR 2,625,777 describes a sensor device positioned in front of an encoder element built into a seal, via an orientable support of substantially annular shape. Said support is fixed to a spacer piece itself trapped between the outer lateral faces of the stationary race of the bearing and of the shoulder of the stub axle carrier. This method of mounting has the drawback of increasing the track width of the vehicle equipped therewith.

By comparison with the same vehicle not equipped with the device of FR 2,625,777 for picking up the rotational speed, total track width is increased an amount equal to twice the thickness of the spacer piece. The position of each brake drum is thus offset relative to the backing plate supporting the brake linings, as is the hydraulic activating device, by an amount equal to the thickness of the spacer piece in the direction of the outside of the vehicle. For its part, the position of the backing plate is not altered by the spacer piece.

The foregoing illustrates limitations known to exist in present devices and methods. Thus, it is apparent that it would be advantageous to provide an alternative directed to overcoming one or more of the limitations set forth above. Accordingly, as suitable alternative is provided including features more fully disclosed hereinafter.

SUMMARY OF THE INVENTION

In one aspect of the invention, this is accomplished by providing a rolling-contact bearing comprising an inner race, an outer race mounted via rolling bodies around the inner race, one of the races being a rotatable race, and seals that seal the bearing. One of the seals incorporates an encoder element rotatable with the rotating race and includes an armature that has a radial extension extending along a lateral face of the rotating race.

In another aspect of the invention, this is accomplished by providing a wheel hub mounted via a rolling-contact bearing comprising an inner race, an outer race mounted via rolling bodies around the inner race, one of the races being a rotatable race, and seals that seal the bearing. One of the seals incorporates an encoder element rotatable with the rotating race and includes an armature that has a radial extension extending along a lateral face of the rotating race.

The foregoing and other aspects will become apparent from the following detailed description of the invention when considered in conjunction with the accompanying drawing figures.

BRIEF DESCRIPTION OF THE DRAWING FIGURES

FIG. 2 is an enlargement of FIG. 1 illustrating the device for measuring the speed of a bearing according to the present invention;

FIG. 3 is a further enlargement in axial section of the bearing seal of FIG. 1 according to the present invention; and FIG. 4 is an enlargement of FIG. 1 illustrating the retaining ring according to the present invention.

DETAILED DESCRIPTION

Figure 1:
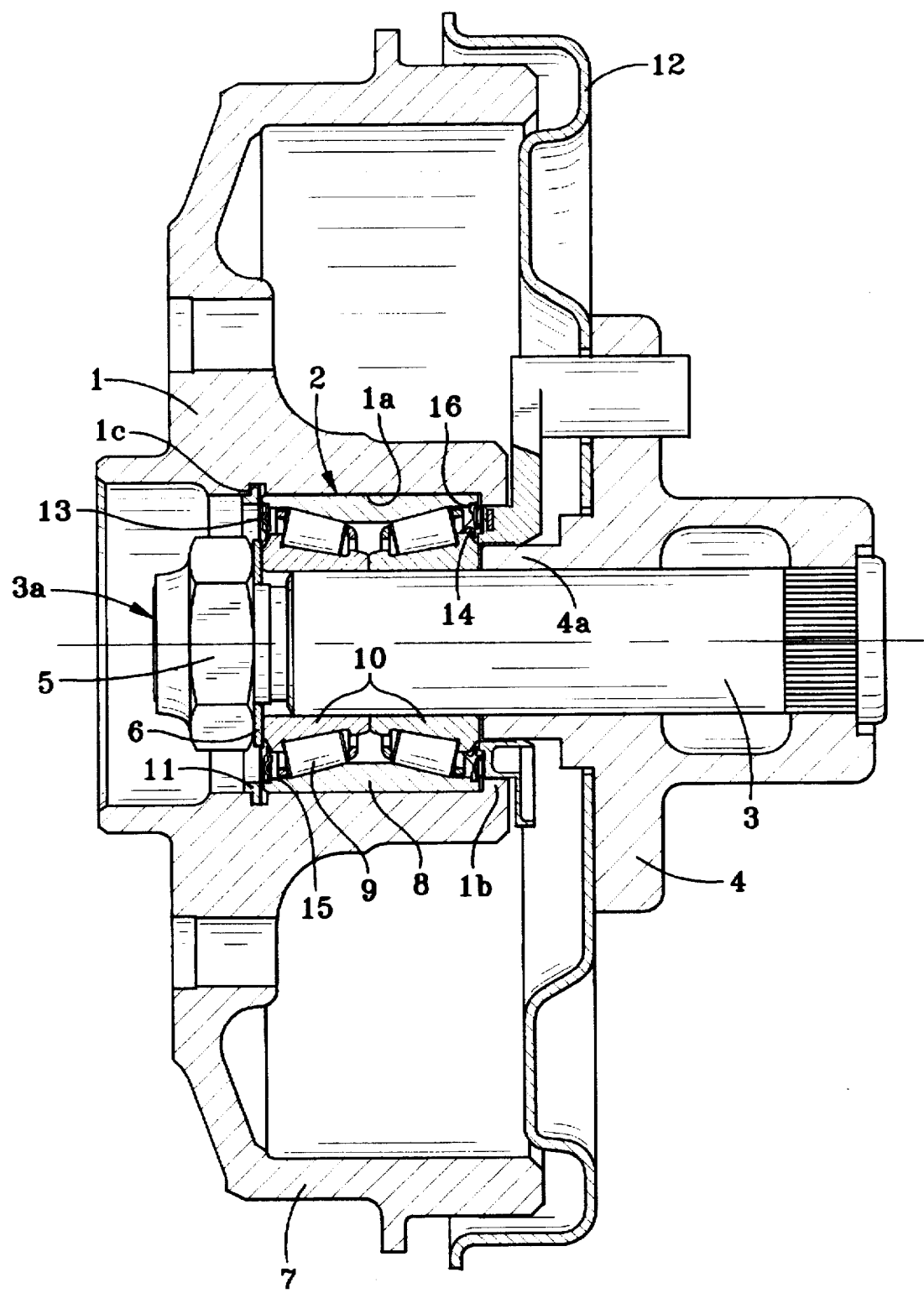
FIG. 1 is a sectional view of a non-driven wheel assembly illustrating an embodiment of a wheel hub according to the present invention.

FIG. 1 represents the hub 1 of a non-driven wheel of a motor vehicle. The hub 1 is mounted via a bearing 2 housed in an interior bore 1a of the hub 1 about a stub axle 3 and bearing against a stub axle carrier 4. A bolt 5 screwed into the outer end 3a of the stub axle 3 holds the bearing 2 via a washer 6 for preloading said bearing 2.

The hub 1 is extended in the radial direction by a brake drum 7. The bearing 2 consists of an outer race 8 mounted, via rolling bodies 9, about two inner races 10. The hub 1 bears, in the direction of the outside of the vehicle, against a lateral face of the outer race 8 of the bearing 1 via the shoulder 1b axially delimiting the bore 1a in the direction of the inside of the vehicle. In addition, the hub 1 is axially immobilized in the direction of the outside of the vehicle by a circular retaining ring 11 mounted in a circular groove 1c machined in the bore 1a. A brake backing plate 12, on which the various elements of the brake device (not represented in the figures) are mounted, is fixed to the stub axle carrier 4.

The bearing 2 is sealed by seals 13 and 14 mounted on each face of the bearing 2 inside grooves 15 and 16 provided on the interior face of the outer race 8, in a way known per se. The seal 14 arranged on the interior side of the wheel and which is represented in FIGS. 2 and 3 is equipped with a magnetic encoder 17 as described, for example, in the U.S. Pat. No. 5,431,413. The seal 14 includes an armature 18, for example a metal one, over which there are molded, on the one hand, a sealing gasket 19 and, on the other hand, the magnetic encoder 17.

The magnetic encoder 17 interacts with a sensor unit 20 fixed to the stub axle carrier 4 via a support 21 consisting of a tubular part 21a push-mounted around the outer end 4a of the stub axle carrier 4 and of a crown 21b radially extending said tubular part 21a so that it covers the outer end 4a of said stub axle carrier 4 as far as the stub axle 3. This crown 21b introduces an offset, toward the outside of the vehicle, of the axial position of the bearing 2 by an amount equal to the thickness of the crown 21b.

In order to take up this offset which moves the bearing 2, and therefore the hub 1, against the outer race 8 of said bearing 2 by its shoulder 1b toward the outside of the vehicle without, however, having to resort to a bearing having dissymmetric raceways, the armature 18 of the seal 14 has a radial extension 22 which extends along the lateral face of the outer race 8. This radial extension 22, which is therefore trapped between said lateral face of the outer race 8 and the shoulder 1b, is chosen with a thickness equal to that of the crown 21b, thus taking up the axial offset and ensuring that the hub 1 is correctly positioned.

The seal 14 is fixed to the bearing 2 by its sealing gasket 19 which fits, via its heel 23, into the groove 16 of the outer race 8. The offset introduced by the thickness of the crown 21b and of the radial extension 22 of the armature 18 causes the bearing 2 to be offset toward the outside. Quite obviously, and in order for mounting still to be possible without having to machine another groove, it is necessary for the thickness of the crown 21b, and therefore of the radial extension 22, to be less than the thickness of the groove 1c in the direction of the axis. The lateral face of the outer race 8 now protrudes above the circular groove 1c. The thickness of that part 11a of the circular retaining ring 11 which is pushed into the groove 1c is limited to the width of the groove 1c less the thickness of the crown 21b.

Also, according to a special alternative form of the invention making it possible not to modify the hub 1 while providing sufficient axial retention, the part 11a of the circular retaining ring 11 is extended, out of the groove 1c, in the direction of the outside of the wheel, along the interior bore 1a of the hub 1, by an annular part 11b giving the ring 11 an "L"-shaped overall radial section, as is represented in FIG. 4. The length, along the axis, of this annular part 11b will be chosen to be at least equal to the thickness of the crown 21b.

As a result of the present invention, it is possible to keep the initial and standard positioning of the brake drum relative to the backing plate to which the linings are attached, and thus avoid any modification to the braking device. This is because the bearing sealing device according to the invention makes it possible to compensate for the axial offset of the bearing, this offset being associated with the mounting of the sensor unit on a spacer piece.

The bearing is mounted inside an inner bore of the hub in which is mounted a circular retaining ring bearing against the outer lateral face of the outer race of the bearing. The thickness, along the axis, of that part of the retaining ring situated inside the circular groove is less than the thickness, along the axis, of the groove. The difference in thickness between the groove and that part of the retaining ring situated inside the circular groove is equal to the axial offset introduced between the stub axle carrier and the inner race of the bearing by the fixing of the sensor element to the stub axle carrier. As a result, the circular groove on the interior bore of a conventional hub may be used to axially fix the bearing, using a retaining ring.

According to another feature of the invention, the circular retaining ring is extended out of the circular groove, in the direction of the outside of the wheel, along the inner bore of the hub in the form of an annular part giving said ring an "L"-shaped overall radial section, with the length, in the direction of the axis, of the annular part is at least equal to the thickness of the radial extension of the armature. As a result, it is possible to ensure correct axial fixing of the bearing despite the reduction in available width within the circular groove for mounting a retaining ring.

Of course, the invention is not in any way limited to the embodiment described and illustrated, which was given merely by way of example. In particular, any bearing in which the seal has a radial extension which compensates for the thickness of the device for fixing the sensor element to the stub axle carrier would not be departing from the scope of the invention irrespective of the form which this extension or this fixing device takes. Likewise, this bearing can be fixed inside the hub using a means other than the circular groove which already exists there, without in any way departing from the scope of the invention.

Having described the invention, what is claimed is:

1. A rolling-contact bearing comprising:
   an inner race;
   an outer race mounted, via rolling bodies, around the inner race, one of the races being a rotating race and having a lateral face;
   seals which seal the bearing, one of the seals incorporating an encoder element rotatable with the rotating race, the seal incorporating the encoder element also including an armature that has a radial extension extending along the lateral face of the rotating race of the bearing, the radial extension having an axial thickness; and
   a spacer extending along a lateral face of the other of the races, the spacer having an axial thickness substantially the same as the axial thickness of the armature radial extension.

2. The rolling-contact bearing according to claim 1 wherein the spacer is a support for a sensor element for interacting with the encoder element.

3. A wheel bearing assembly comprising:
   a stub axle;
   a rolling-contact bearing comprising an inner race, an outer race mounted via rolling bodies around the inner race, one of the races being a rotating race and having a lateral face, and a seal incorporating an encoder element rotatable with the rotating race, the seal incorporating an armature with a radial extension extending along the lateral face of the rotating race of the bearing, the radial extension having an axial thickness;
   a wheel hub rotatably mounted about the stub axle via the rolling-contact bearing; and
   a sensor element mounted on the other of the races by sensor fixing means such that an axial offset is introduced between the stub axle and said other race is substantially equal to the axial thickness of the armature radial extension.

4. A wheel bearing assembly according to claim 3, wherein the bearing is mounted inside an inner bore of the hub including a circular groove in which there is mounted a circular retaining ring bearing against the outer lateral face of the outer race of the rolling-contact bearing.

5. A wheel bearing assembly according to claim 4, wherein the circular retaining ring is extended out of the circular groove, in the direction of the outside of the wheel, along the inner bore of the hub in the form of an annular part giving said ring an "L"-shaped overall radial section.

6. A wheel bearing assembly according to claim 5, wherein the length, in the direction of the axis, of the annular part is at least equal to the thickness of the radial extension of the armature.

7. A wheel bearing assembly according to claim 4, wherein the thickness, along the axis, of that part of the retaining ring which is situated inside the circular groove is less than the thickness, along the axis, of said groove.

8. A wheel bearing assembly according to claim 7, wherein the difference in thickness, along the axis, between the groove and that part of the retaining ring which is situated inside said circular groove is equal to the axial offset introduced between the stub axle and said other race of the rolling-contact bearing by the means of fixing the sensor element to the stub axle.

9. The wheel bearing assembly according to claim 3, wherein the stub axle is comprised of two elements, a stub axle shaft and a stub axle carrier.

* * * * *